United States Patent
Erben et al.

(10) Patent No.: US 6,619,591 B2
(45) Date of Patent: Sep. 16, 2003

(54) METHOD AND ARRANGEMENT FOR ADJUSTING A DOOR-SIDE SAFETY DEVICE OF AN AIRPLANE DOOR

(75) Inventors: Hannes Erben, Donauwörth (DE); Alexander Engleder, Taufkirchen (DE)

(73) Assignee: Eurocopter Deutschland GmbH, Donauwörth (DE)

( * ) Notice: Subject to any disclaimer, the term of this patent is extended or adjusted under 35 U.S.C. 154(b) by 0 days.

(21) Appl. No.: 10/108,645

(22) Filed: Mar. 29, 2002

(65) Prior Publication Data

US 2002/0139898 A1 Oct. 3, 2002

(30) Foreign Application Priority Data

Mar. 30, 2001 (DE) .......................................... 101 16 224

(51) Int. Cl.$^7$ ................................................. B64C 1/14
(52) U.S. Cl. ................................ 244/129.5; 244/129.1; 244/129.4; 49/139
(58) Field of Search ........................... 244/118.5, 129.4, 244/129.5, 137.1, 137.2; 49/139; 292/259 A

(56) References Cited

U.S. PATENT DOCUMENTS

| | | | | | |
|---|---|---|---|---|---|
| 3,647,169 A | * | 3/1972 | Allwright et al. | ........ | 244/129.5 |
| 3,802,125 A | * | 4/1974 | Baker | .......................... | 49/360 |
| 3,852,854 A | * | 12/1974 | Sigrud et al. | ............. | 244/137.2 |
| 4,470,566 A | * | 9/1984 | Fitzgerald | ................. | 244/129.5 |
| 4,560,123 A | * | 12/1985 | Sealey et al. | ............. | 244/129.5 |
| 4,944,473 A | * | 7/1990 | Kallies et al. | ............ | 244/129.5 |
| 5,031,863 A | * | 7/1991 | Noble | ....................... | 244/129.5 |
| 5,086,587 A | * | 2/1992 | Andrews | ...................... | 49/395 |
| 5,577,781 A | * | 11/1996 | Kallies et al. | ............... | 292/195 |

* cited by examiner

Primary Examiner—Michael Carone
Assistant Examiner—Gabriel S. Sukman
(74) Attorney, Agent, or Firm—Crowell & Moring LLP

(57) ABSTRACT

A method and an arrangement for adjusting a door-side safety device of an airplane door is provided to further improve the ergonomics for the operation of the door. A safety shaft of a safety device arranged on the door side can be adjusted by a coupling device by a driving device arranged on the frame side between the locked condition and the secured locked condition. The safety shaft arranged on the door side is coupled by way of a coupling device arranged between the door and the frame with the driving device arranged on the frame side and connected by way of the operating shaft. This arrangement allows an operation of the door in the cabin interior by an operating element which is arranged on the frame side next to the door opening. By means of this operating element, it is possible to control the movement of the door and to generate a door-side movement of the safety device by way of a movement of a device arranged on the frame side, so that the door can be secured in the locked condition, or the securing can be released in the locked condition.

22 Claims, 4 Drawing Sheets

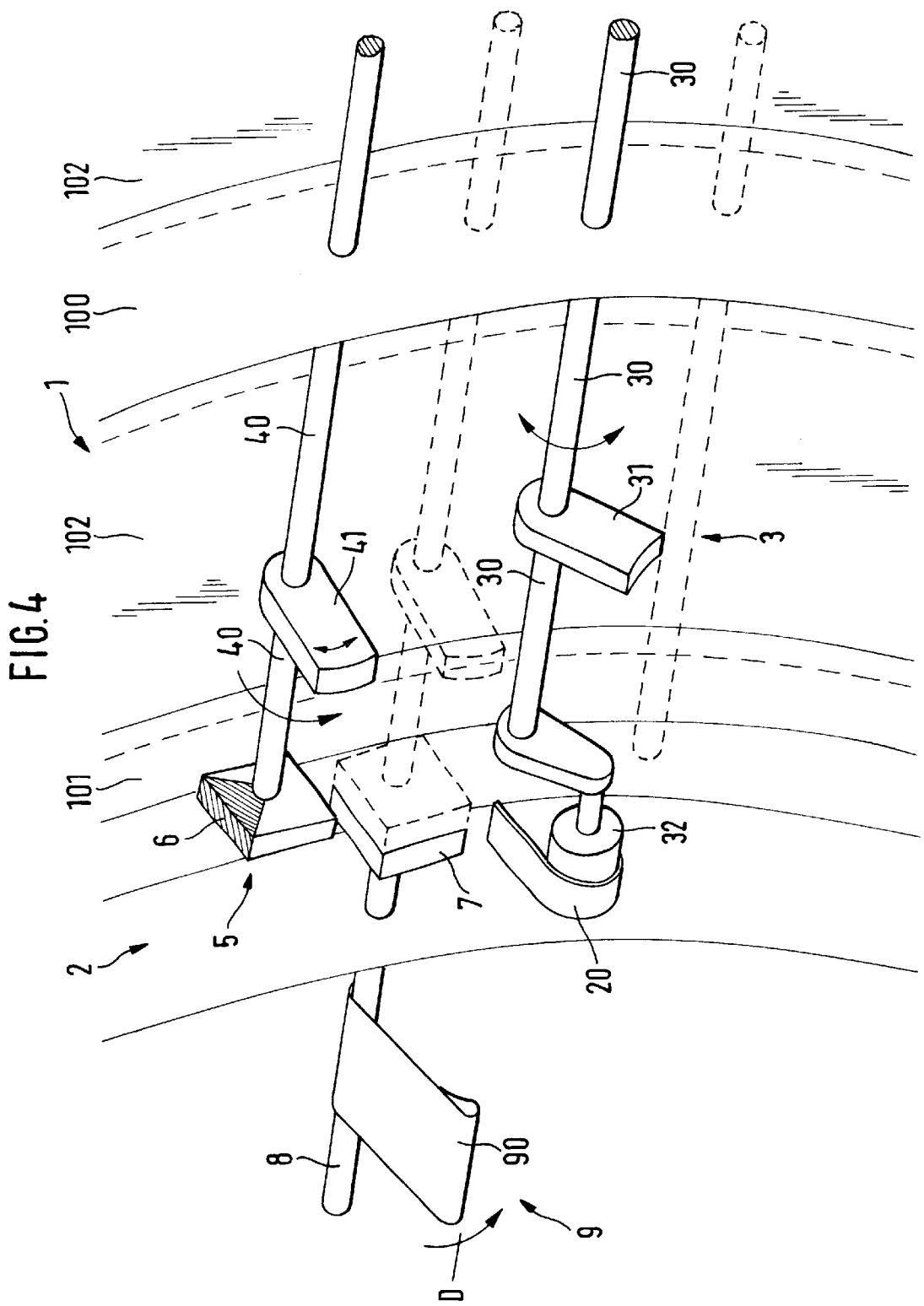

METHOD AND ARRANGEMENT FOR ADJUSTING A DOOR-SIDE SAFETY DEVICE OF AN AIRPLANE DOOR

This application claims the priority of German application 101 16 224.3, filed Mar. 30, 2001, the disclosure of which is expressly incorporated by reference herein.

BACKGROUND AND SUMMARY OF THE INVENTION

The invention relates to a method of adjusting a door-side safety device of an airplane door, in which case, in the closed condition, with an adjusting safety device, a safety element of a safety shaft is adjusted with respect to the engagement of a stop device of a locking shaft of a locking device, so that an adjustment can take place between a locked condition of the door and a secured locked condition of the door, and a driving force for the adjustment of the safety device is generated by a driving device which can be coupled with the safety shaft. Furthermore, the invention relates to an arrangement for adjusting a door-side safety device of an airplane door, in which case, in the closed condition, a safety element of the safety shaft of a safety device can be adjusted with respect to the engagement of a stop device of the locking shaft of a locking device, and the safety device adjusts the locking device between the locked condition and the condition of a secured locking, and the safety device can be adjusted by a driving device.

The closing operation of a known airplane door comprises the swivelling of the airplane door from an end position in front of the opening in the airplane fuselage. This is implemented by a swivelling device of the door. Subsequently, the door is lowered into a closed condition. This is implemented by a lowering or lifting mechanism. Furthermore, the airplane door is locked by means of a locking device in the closed condition. This locking device is then secured by means of a safety device. This is called a secured locking.

A reverse sequence takes place during the opening operation. The safety device is operated for releasing the locking device. Subsequently, the locking device is unlocked. In this case, the door is still in the closed condition. The door is then lifted by means of the lifting/lowering mechanism and, when the end of the lifting path has been reached, the door starts to swing into an end position of the opening.

In the case of known airplane doors, the operation of the door for reaching the individual conditions is controlled by means of at least one door-side hand lever (interior hand lever/exterior hand lever), which in the following will only be called "interior hand lever". In this case, the interior hand lever is moved on a moving path from an initial position into an end position, and when defined points on the moving path of the interior hand lever have been reached, the control of the individual devices is initiated and/or terminated. Each of the devices contains mechanisms consisting of subassemblies, structural members and components, driving devices and power transmission devices also being present.

In the case of airplanes with known kinematics for opening and closing a door, an operating device, such as the hand lever, is always arranged on the interior and exterior side of the door. With the development of large aircraft, the vertical distance between the airplane door and the standing area on the ground is increased. The operating of an interior hand lever of an opened door is ergonomically not optimal. The operator must lean out of the door opening in order to reach the interior hand lever. The operation of an interior hand lever of an opened door situated in the end position is not yet sufficiently comfortable.

It is an object of the invention to further improve the ergonomics for the operation of the door.

This object is achieved according to certain preferred embodiments of the invention by providing a method of adjusting a door-side safety device of an airplane door, in the closed condition, with an adjusting of the safety device, a safety element of a safety shaft being adjusted with respect to the engagement of a stop device of a locking shaft of a locking device, so that an adjustment can take place between a locked condition of the door and a secured locked condition of the door, and a driving force for the adjustment of the safety device is generated by a driving device which can be coupled with the safety shaft, wherein the safety shaft of the safety device arranged on the door side can be adjusted between the locked condition and the secured locked condition by means of a coupling device by a driving device arranged on the frame side.

In a further development of certain preferred embodiments of the invention, a driving device, which is arranged in the structure of the frame and has an operating shaft, is coupled by way of a coupling device arrangeable between the door and the frame with the door-side safety shaft of a safety device, the driving device adjusting the coupling device such that, in the secured locked condition, the operating shaft is coaxially coupled with the safety shaft and, in the unsecured locked condition, the shafts are uncoupled and offset with respect to one another.

The object is also achieved according to certain preferred embodiments of the invention by providing an arrangement for adjusting a door-side safety device of an airplane door, in the closed condition, a safety element of the safety shaft of a safety device being adjustable with respect to the engagement of a stop device of the locking shaft of a locking device, and the safety device adjusting the locking device between the locked condition and the secured locked condition, and the safety device being adjustable by a driving device, wherein the safety shaft arranged on the door side is coupled by way of a coupling device arranged between the door and the frame with a driving device arranged on the frame side and connected by way of an operating shaft.

Another advantageous characteristic of certain preferred embodiments in that the driving device is a mechanically acting hand lever. However, it may also be an electrically controllable electric drive according to the preferred embodiments of the invention.

It is another characteristic of certain preferred embodiments of the invention is that the coupling device is formed of a coupling subassembly arranged on the frame side and of a coupling subassembly arranged on the door side, the frame-side coupling subassembly being connected with the operating shaft and the door-side coupling subassembly being connected with the safety shaft.

In certain preferred embodiments of the invention, the frame-side coupling subassembly is formed of a catch band, while the door-side coupling subassembly is formed as a roller lever. The coupling device engages the two coupling subassemblies such that the operating shaft and the safety shaft are held coaxial with respect to one another. During the uncoupling, the safety shaft takes up a changed position with respect to the operating shaft.

The invention clearly improves the ergonomics for operating an airplane door, particularly a passenger door. When the airplane door is open, an operating of the door takes place by operating elements in the cabin interior which are arranged next to the door opening in the fuselage. Such an operating element may also be a mechanically acting interior hand lever or a controllable electric drive which acts as an actuator and can be controlled by way of a keyboard.

The invention permits the controlling of the door movement by way of a device arranged on the frame side, and in the locked condition of the door, the triggering of a door-side movement of the safety shaft of a safety device, so that the locking device can be secured or the securing can be released.

Other objects, advantages and novel features of the present invention will become apparent from the following detailed description of the invention when considered in conjunction with the accompanying drawings.

BRIEF DESCRIPTION OF THE DRAWINGS

FIG. 4 is a schematic illustration of the arrangement of FIG. 1, shown in with the door moving downward to a door closed position.

DETAILED DESCRIPTION OF THE DRAWINGS

Figure 1:
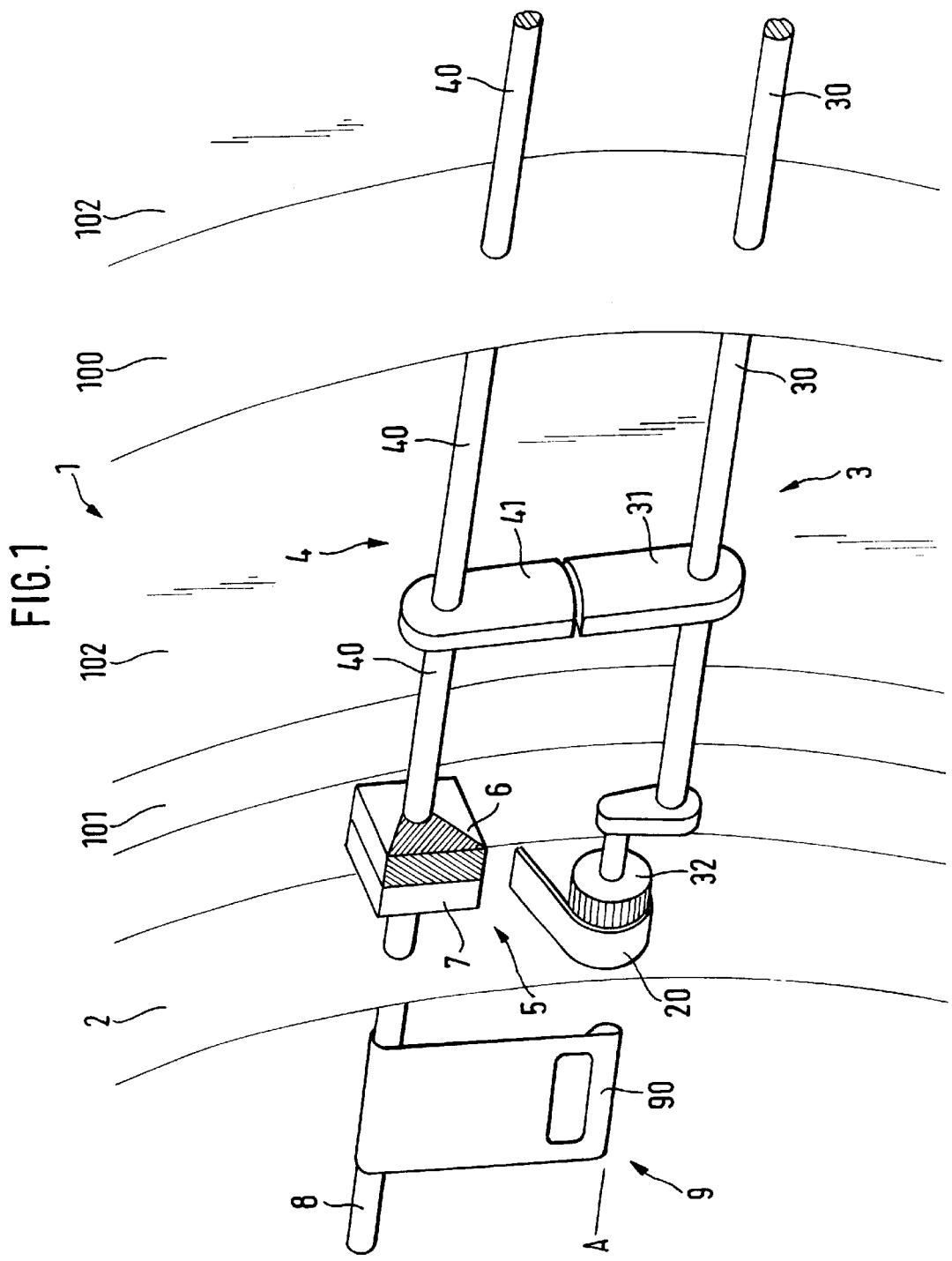
FIG. 1 is a schematic illustration of an airplane door at an airplane frame with a locking mechanism and security mechanism for the locking mechanism in a door locked and secured position, constructed according to a preferred embodiment of the present invention.

FIG. 1 is a schematic view of the closed condition of the door 1 (illustrated on a door section), in which case the door 1 seals off the frame 2. The door 1 has ribs 100, 101 which are connected with the skin 102. In this case, the door 1 is in the closed condition, in which case the locking device 3 is locked and is secured by a safety device 4. The locking device 3 is illustrated by the locking shaft 30 with a stop device 31 fixedly connected with the locking shaft. The locking of the door takes place by a door-side locking device 32 which engages with a frame-side locking device 20. This locked condition is secured by the safety device 4. In the secured locked condition, a safety element 41 of the safety shaft 40 abuts on the stop device 31, so that a subsequent moving of the locking shaft 30 is blocked. FIG. 1 also shows that the safety shaft 40 has a door-side coupling subassembly 6 constructed at its end. This door-side subassembly 6 engages with a frame-side coupling subassembly 7 which, in turn, is connected with an operating shaft 8 arranged in the structure of the frame 2, which operating shaft 8 is connected by means of power transmission devices or directly with a driving device 9. This driving device 9 may be a controllable electric drive or a manually operable interior hand lever 90. In the following, the example will be explained by means of an interior hand lever.

In the secured locked condition, the interior hand lever 90 is in an initial position A. The interior hand lever is therefore not arranged in the door 1 but next to the door in the structure of the frame 2. By means of a coupling device 5, the ends of the operating shaft 8 and of the safety shaft 40 are mutually coupled and arranged in a coaxial manner.

Starting from the secured locked condition illustrated in FIG. 1, the adjustment of the door-side safety device into the condition of an unsecured locking (condition in which only the locking is in effect) will be described in the following.

Figure 2:
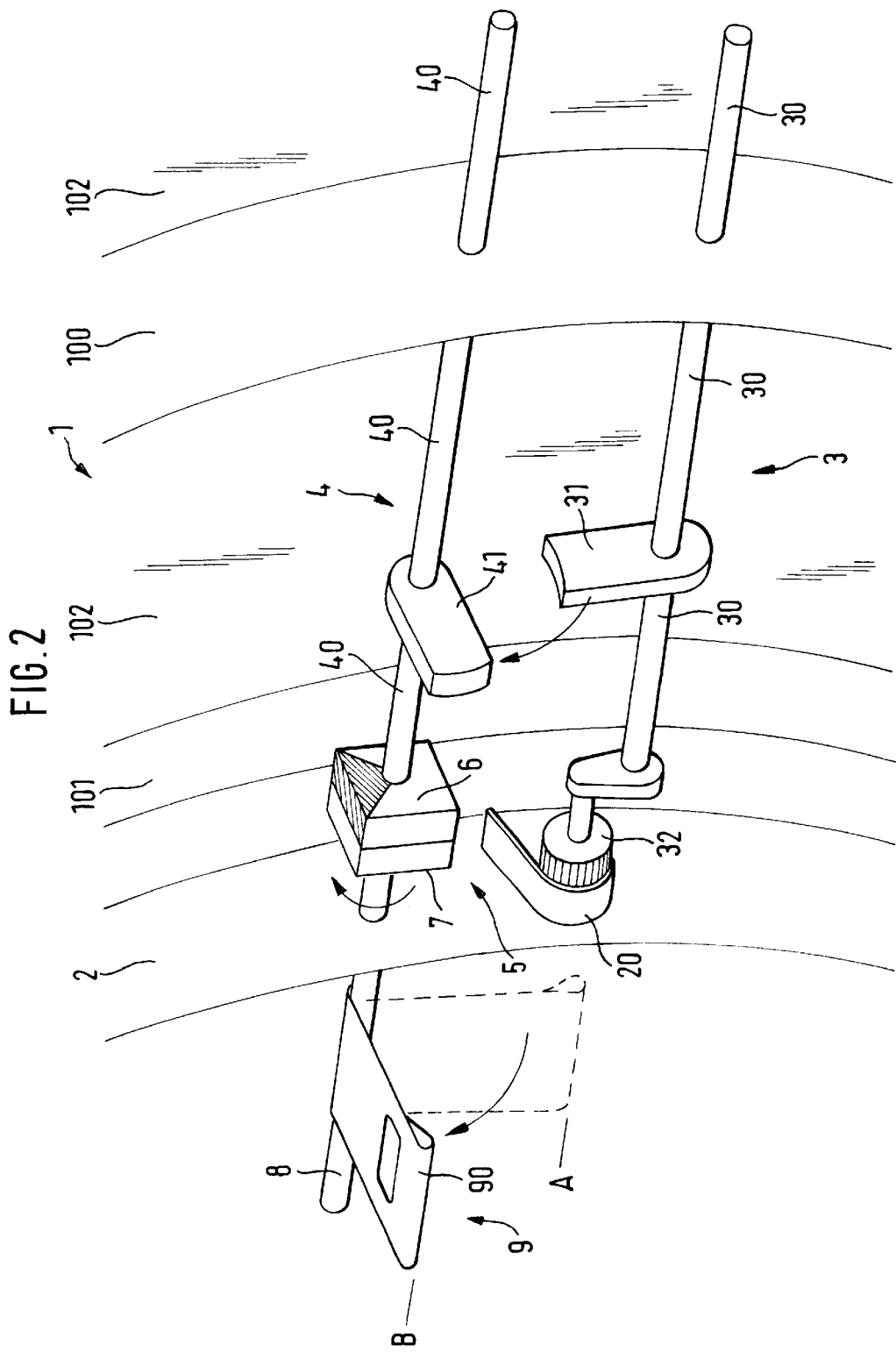
FIG. 2 is a schematic illustration of the arrangement of FIG. 1 shown in a door locked unsecured position.

FIG. 2 shows a position in which the interior hand lever 90 was moved from the initial position A into a so-called unsecured neutral position B. It is illustrated that the safety element 4 is moved out of the engagement of the stop device 31 by means of the movement of the interior hand lever 90 and thus by means of the movement of the safety shaft 40. The locking device 3 is therefore no longer secured but not yet unlocked. This corresponds to a so-called neutral position B of the interior hand lever.

Starting from this neutral position B of the interior hand lever, the latter can continue to be moved into an opening position C, which may be called the end position of the unsecured locked condition. The further opening operation of the door starts in this end condition. The unlocking of the locking device and all subsequent actions until the door is opened start in this end position of the unsecured locked condition. If, during an in-between period, the opening position C is left again in the direction of the neutral position, the initiated opening operation is stopped. Otherwise, the door is guided into the end position of the opening.

Figure 3:
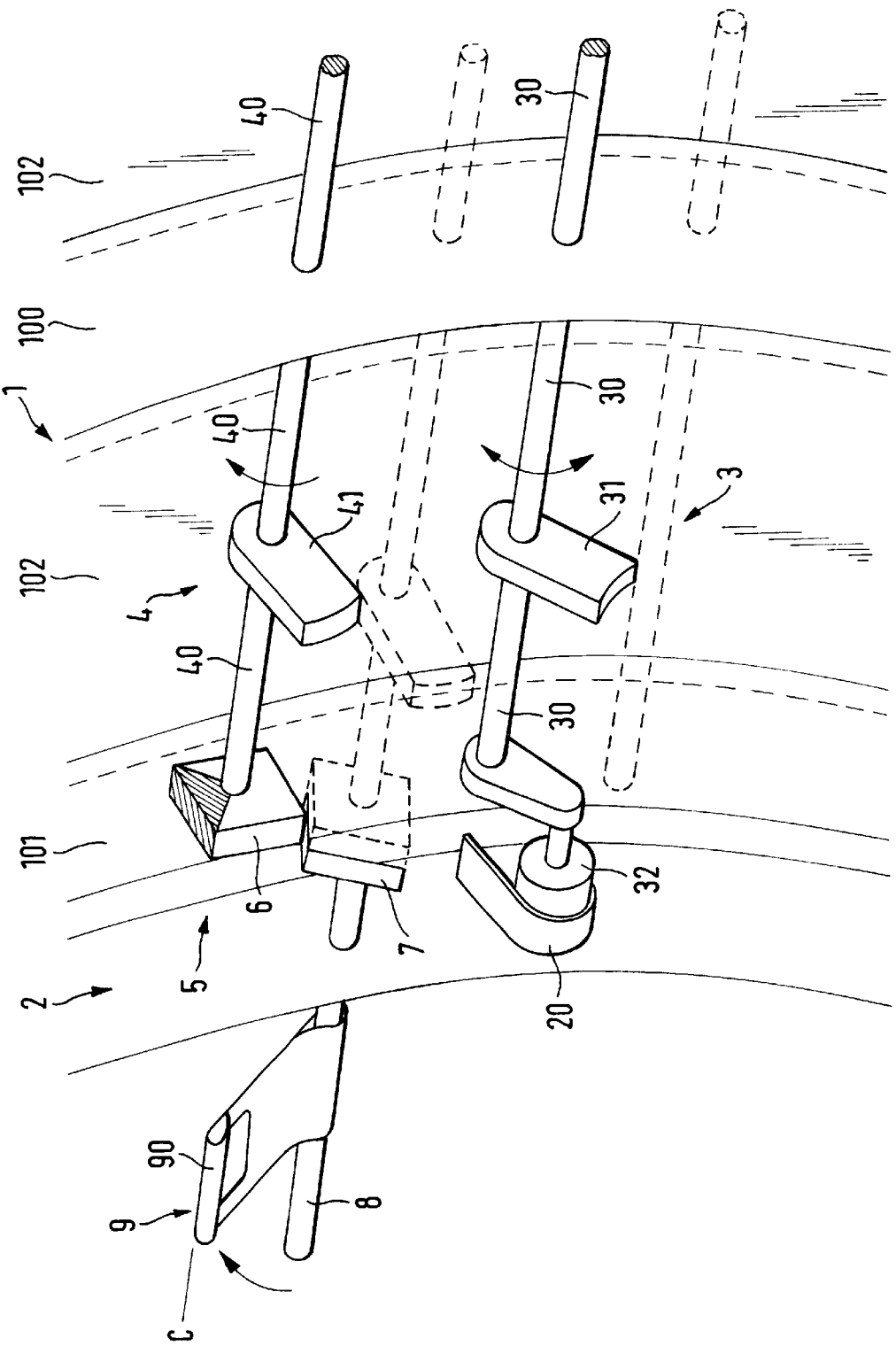
FIG. 3 is a schematic illustration of the arrangement of FIG. 1, shown in a door unlocked lifted position for opening.

FIG. 3 illustrates details of the adjusting of the interior hand lever 90 to the opening position C as the end position. It shows the position of the locking shaft 30 and of the safety shaft 40. The coupling device 5 is separated; that is, the operation of lifting the door 1 by means of the locking shaft 30 starts, and the safety shaft 40 is guided out of the coaxial position with respect to the operating shaft 8.

It should be noted that the door-side locking device 32, specifically a roller lever, is still in an engagement with the frame-side locking device 20 but the locking shaft 30 was lifted out of an original position and the stop device 31 was lowered in the process. The door can be lifted to an end position of the lifting-movement path by means of the lifting mechanism. In this case, the door-side locking device 32 leaves the frame-side locking device 20. The swivelling of the door, together with the supporting arm holding it, by means of the swivelling mechanism can now start.

The swivelling-open of the door 1 and the reaching of the end position conclude the opening operation, and the interior hand lever can be returned into the neutral position B. In its opening position C, the interior hand lever not only implements the release of the securing of the locking device but, in position C, also controls all subsequent steps of the opening operation. These subsequent steps of the opening operation are controlled by means of a known sequence control.

For initiating the closing operation, the interior hand lever 90 is pressed out of the neutral position B into the closing position D and is held (FIG. 4). In this position D, contact is supplied to the controlling devices which control the swivelling of the door in front of the opening, the lowering of the door inside the opening into the closing condition as well as the locking by means of the door-side locking device 32 in the frame-side locking device 20. As a result, the locked condition is reached. The door is in an unsecured locked condition. With the reaching of the locked condition, the interior hand lever must be swivelled out of the closing position D further in the direction of the initial position A. During this swivelling, the locking shaft 30 is lowered and the stop device 31 is rotated; simultaneously, during the lowering of the door 1, by means of the frame-side coupling subassembly positioned in the catch position, the door-side coupling subassembly 6 is caught and guided to the stop. The coupling device 5 is coupled. The operating shaft 8 and the safety shaft are coaxially coupled. Simultaneously, the safety element 41 engages with the stop device 31. As a result, the condition of the secured locking is reached again.

As a result of mechanical control arranged on the frame side, the invention permits, by means of a driving device connected with a fixing shaft, the transmitting of the driving power by way of a coupling device to a door-side safety device with a safety shaft so that, because of the movement of the safety device which can be generated, a securing or a release of the securing of the locking device can be implemented. The transmission of the power from the frame-side mechanical control to the door-side securing device takes place by the coupling device. The coupling device consists of a frame-side coupling subassembly and of a door-side coupling assembly. The frame-side locking subassembly may be constructed as a catch band opened in a tulip shape, while the door-side locking device subassembly may be arranged as a roller lever. The roller lever is guided along the contour of the catch band to a stop.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. Method of adjusting a door-side safety device of an airplane door, in the closed condition, with an adjusting of the door side safety device, a safety element of a door side safety shaft being adjusted with respect to the engagement of a stop device of a door side locking shaft of a locking device, so that an adjustment can take place between a locked condition of the door and a secured locked condition of the door, and a driving force for the adjustment of the door side safety device is generated by a driving device which is selectively coupled with the door side safety shaft, wherein the door side safety shaft of the safety device arranged on the door side can be adjusted between the locked condition and the secured locked condition by means of a coupling device and the driving device arranged on the frame side.

2. Method according to claim 1, wherein the driving device is arranged in structure of the frame and has an operating shaft which is coupled by way of a coupling device arrangeable between the door and the frame with a door-side safety shaft of a safety device, the driving device adjusting the coupling device such that, in the secured locked condition, the operating shaft and the safety shaft are coaxially coupled and, in the unsecured locked condition, the operating shaft and the safety shaft are uncoupled and mutually offset.

3. Arrangement for adjusting a door-side safety device of an airplane door at an airplane frame, in the closed condition, a safety element of a door side safety shaft of the door side safety device being adjustable with respect to engagement of a stop device of the locking shaft of a locking device, and the door side safety device adjusting the locking device between a locked condition and a secured locked condition, and the door side safety device being adjustable by a frame side driving device, wherein the door side safety shaft is coupled by way of a selectively engageable coupling device arranged between the door and the frame with the driving device arranged on the frame side and connected by way of an operating shaft.

4. Arrangement according to claim 3, wherein the driving device is a mechanically acting hand lever.

5. Arrangement according to claim 3, wherein the driving device is an electrically controllable electric drive.

6. Arrangement according to claim 3, wherein the coupling device is formed by a coupling subassembly arranged on the frame side and a coupling subassembly arranged on a door side, the frame-side coupling subassembly being connected with the operating shaft and the door-side subassembly being connected with the safety shaft.

7. Arrangement according to claim 6, wherein a frame-side locking device subassembly is formed of a catch band and a door-side locking device subassembly is formed of a roller lever.

8. Arrangement according to claim 6, wherein the coupling device engages the two coupling subassemblies such that the operating shaft and the safety shaft are held coaxially with respect to one another.

9. An airplane assembly comprising:
   an airplane frame with a door opening,
   a door movable between a closed position closing the door opening and an open position accommodating passenger movement through the door opening,
   a locking assembly operable to lock the door in the closed position, and
   a safety assembly operable to secure the locking assembly in a locked position with the door in the closed position, wherein said safety assembly includes:
   a door side safety shaft on the door;
   a frame side safety shaft on the frame, and
   a coupling device operable to selectively couple and uncouple said door side safety shaft and frame side safety shaft with respect to one another, said coupling device including a driving device arranged on the frame.

10. An airplane assembly according to claim 9, wherein said coupling device includes a manually engageable operating member supported at said frame adjacent said door opening.

11. An airplane assembly according to claim 9, wherein said coupling device includes an electrically controllable electric drive supported at said frame adjacent said door opening.

12. An airplane assembly according to claim 9, wherein said door side safety shaft and frame side safety shaft are configured to be axially aligned when said door is in said closed position.

13. An airplane assembly according to claim 12, wherein said locking assembly includes a rotatable locking shaft on said door.

14. An airplane assembly according to claim 13, wherein said locking shaft extends parallel to and spaced from said door side safety shaft.

15. An airplane assembly according to claim 14, wherein said locking shaft includes a radial locking portion which is selectively engaged with a radial securing portion of said door side safety shaft when said assembly is in a door locked secured position.

16. An airplane assembly according to claim 15, wherein said coupling device includes a manually engageable operating member supported at said frame adjacent said door opening.

17. An airplane assembly according to claim 15, wherein said coupling device includes an electrically controllable electric drive supported at said frame adjacent said door opening.

18. An airplane assembly according to claim 15, wherein said door side safety shaft and frame side safety shaft are configured to be axially aligned when said door is in said closed position.

19. A method according to claim 1, wherein the airplane door is swivelable in use between the closed and an open position.

20. A method according to claim 3, wherein the airplane door is swivelable in use between the closed and an open position.

21. Method of adjusting a door-side safety device of an airplane door, in the closed condition, with an adjusting of the safety device, a safety element of a safety shaft being adjusted with respect to the engagement of a stop device of a locking shaft of a locking device, so that an adjustment can take place between a locked condition of the door and a secured locked condition of the door, and a driving force for the adjustment of the safety device is generated by a driving device which can be coupled with the safety shaft, wherein the safety shaft of the safety device arranged on the door side can be adjusted between the locked condition and the secured locked condition by means of a coupling device by a driving device arranged on the frame side, and wherein wherein the driving device is arranged in structure of the frame and has an operating shaft which is coupled by way of a coupling device arrangeable between the door and the frame with a door-side safety shaft of a safety device, the driving device adjusting the coupling device such that, in the secured locked condition, the operating shaft and the safety shaft are coaxially coupled and, in the unsecured locked condition, the operating shaft and the safety shaft are uncoupled and mutually offset.

22. Arrangement for adjusting a door-side safety device of an airplane door, in the closed condition, a safety element of the safety shaft of a safety device being adjustable with respect to the engagement of a stop device of the locking shaft of a locking device, and the safety device adjusting the locking device between the locked condition and the secured locked condition, and the safety device being adjustable by a driving device, wherein the safety shaft arranged on the door side is coupled by way of a coupling device arranged between the door and the frame with a driving device arranged on the frame side and connected by way of an operating shaft, the coupling device is formed by a coupling subassembly arranged on the frame side and a coupling subassembly arranged on a door side, the frame-side coupling subassembly being connected with the operating shaft and the door-side subassembly being connected with the safety shaft, and the coupling device engages the two coupling subassemblies such that the operating shaft and the safety shaft are held coaxially with respect to one another.

* * * * *